US010240630B2

(12) United States Patent
Kawaai

(10) Patent No.: US 10,240,630 B2
(45) Date of Patent: Mar. 26, 2019

(54) LEVELING PLATE AND THRUST BEARING DEVICE USING THE SAME

(71) Applicant: DAIDO METAL COMPANY LTD., Nagoya-shi, Aichi-ken (JP)

(72) Inventor: Yuji Kawaai, Inuyama (JP)

(73) Assignee: DAIDO METAL COMPANY LTD., Nagoya-Shi, Aichi (JP)

( * ) Notice: Subject to any disclaimer, the term of this patent is extended or adjusted under 35 U.S.C. 154(b) by 0 days.

(21) Appl. No.: 15/362,382

(22) Filed: Nov. 28, 2016

(65) Prior Publication Data

US 2017/0152888 A1 Jun. 1, 2017

(30) Foreign Application Priority Data

Nov. 26, 2015 (JP) .................... 2015-230595

(51) Int. Cl.

| | |
|---|---|
| *F16C 17/06* | (2006.01) |
| *F01D 25/16* | (2006.01) |
| *F04D 29/041* | (2006.01) |
| *F04D 29/051* | (2006.01) |
| *H02K 7/08* | (2006.01) |

(52) U.S. Cl.
CPC ............. *F16C 17/06* (2013.01); *F01D 25/16* (2013.01); *F01D 25/162* (2013.01); *F01D 25/164* (2013.01); *F04D 29/041* (2013.01); *F04D 29/051* (2013.01); *H02K 7/083* (2013.01); *F05D 2240/52* (2013.01); *F16C 2360/23* (2013.01); *F16C 2380/26* (2013.01); *H02K 7/08* (2013.01); *H02K 2205/03* (2013.01)

(58) Field of Classification Search
CPC .. F16C 17/06; F16C 2360/23; F16C 2380/26; H02K 7/08; H02K 7/083; H02K 2205/03; F01D 25/16; F01D 25/162; F01D 25/164; F04D 29/041; F04D 29/051; F05D 2240/52
See application file for complete search history.

(56) References Cited

U.S. PATENT DOCUMENTS

| 1,265,334 A | * | 5/1918 | Howarth | ................. F16C 17/06 |
| | | | | 384/308 |
| 1,666,521 A | * | 4/1928 | Allen | ...................... F16C 17/06 |
| | | | | 384/306 |

(Continued)

FOREIGN PATENT DOCUMENTS

| DE | 2034946 A1 | 4/1971 |
| EP | 0259991 A2 | 3/1988 |

(Continued)

OTHER PUBLICATIONS

Office Action for British Patent Application No. GB1619848.3, dated May 24, 2017.

(Continued)

*Primary Examiner* — Alan B Waits
(74) *Attorney, Agent, or Firm* — Browdy and Neimark, P.L.L.C.

(57) ABSTRACT

A leveling plate including a main body and an end protrusion. The end protrusion is provided at both ends in a longer side direction of the main body, and protrudes from the main body in a thickness direction, the end protrusion having an end circumferential surface whose central axis extends in parallel with a shorter side direction of the main body.

16 Claims, 7 Drawing Sheets

(56) References Cited

U.S. PATENT DOCUMENTS

| | | | | |
|---|---|---|---|---|
| 2,102,534 A | * | 12/1937 | Howarth | F16C 17/06 384/308 |
| 2,565,116 A | * | 8/1951 | Baudry | F16C 17/06 384/308 |
| 2,874,007 A | * | 2/1959 | Cametti | F16C 17/06 29/447 |
| 3,246,936 A | * | 4/1966 | Carle | F16C 17/06 384/308 |
| 3,620,582 A | | 11/1971 | Sato et al. | |
| 3,702,719 A | * | 11/1972 | Hoffman | F16C 17/06 384/306 |
| 3,912,344 A | * | 10/1975 | McCafferty | F16C 17/06 384/304 |
| 4,515,486 A | * | 5/1985 | Ide | F16C 17/03 384/117 |
| 4,526,482 A | * | 7/1985 | Ide | F16C 17/06 384/104 |
| 4,738,550 A | * | 4/1988 | Gardner | F16C 17/06 384/122 |
| 5,046,864 A | | 9/1991 | Boller | |
| 5,567,057 A | * | 10/1996 | Boller | F16C 17/06 384/122 |
| 5,879,085 A | | 3/1999 | Ball et al. | |
| 6,183,138 B1 | * | 2/2001 | New | F16C 17/06 384/308 |
| 8,408,801 B2 | * | 4/2013 | Waki | F01D 25/18 384/307 |

FOREIGN PATENT DOCUMENTS

| | | |
|---|---|---|
| JP | S55501106 A | 12/1980 |
| JP | 07224843 A | 8/1995 |
| JP | 2013050144 A | 3/2013 |

OTHER PUBLICATIONS

Japanese Patent Application No. 2015-230595,Notification of Reason(s) for Refusal, dated May 9, 2017.

* cited by examiner

LEVELING PLATE AND THRUST BEARING DEVICE USING THE SAME

BACKGROUND OF THE INVENTION

Field of the Invention

The present embodiment relates to a leveling plate and a thrust bearing device using the same.

Description of the Related Art

Rotary machines including various turbines such as a steam turbine, motors, pumps, and the like utilize a thrust bearing device which supports a rotary shaft in an axial direction (see Japanese Patent Laid-Open Nos. 2013-50144 and 7-224843). In such a thrust bearing device, a thrust pad which is in contact with a rotary shaft is supported by a member referred to as a leveling plate. The leveling plate is provided in a plural number in a circumferential direction centering on the rotary shaft so as to follow deformation of the thrust pad thereby facilitating the uniformization of load to which each thrust pad is subjected. In a case of conventional art, contact portions at which leveling plates come into contact with each other are radially provided with a center of the rotary shaft as a starting point. That is, leveling plates which are disposed in an alternating manner are in linear contact with each other at a contact portion which acts as a mutual force point.

However, in the case of a thrust bearing device including a conventional thrust pad, due to displacement of the thrust pad caused by inclination of the rotary shaft member and difference in the thickness of the thrust pad, change of posture, that is, inclination occurs in the leveling plate supporting the thrust pad. When such inclination occurs, a so-called lever ratio, which indicates a ratio of a distance from a first force point (second acting point) to a fulcrum, and a distance from a second force point (first acting point) to the fulcrum, changes from a ratio 1:1, which indicates an ideal state. This is attributable to the fact that a contacting portion extends radially between leveling plates. For that reason, if the height or the thickness differs in the axial direction between thrust pads, load to which the leveling plate is subjected becomes non-uniform. As a result of that, a problem arises in that the load to which the thrust pad is subjected also becomes non-uniform between thrust pads, which may lead to local contact between the thrust pads, as well as phenomena associated therewith such as wear and damage.

Accordingly, it is an objective of the present embodiment to provide a leveling plate which exhibits a small change in lever ratio even if inclination occurs in the leveling plate.

Moreover, it is an objective of the present embodiment to provide a thrust bearing device in which the uniformity of load applied to each member to be supported is improved by using a leveling plate in which change in lever ratio is small.

SUMMARY OF THE INVENTION

A leveling plate of the present embodiment includes a main body and an end protrusion.

The main body includes surfaces extending in first and second directions orthogonal to each other. The end protrusion is provided respectively at both ends of the main body in the first direction, and protrudes from the main body in a third direction perpendicular to the surface, the end protrusion having an end circumferential surface whose central axis extends in the second direction of the main body.

Moreover, the thrust bearing device of the present embodiment includes a first leveling plate, a second leveling plate, a first member, and a second member. Both of the first leveling plate and the second leveling plate are made up of the leveling plate according to any one of claims 1 to 5. The first member has a first surface which comes into contact with an area on an opposite side of the end protrusion in the third direction of the first leveling plate. The second member has a second surface which is provided in parallel with the first surface and comes into contact with an area on an opposite side of the end protrusion in the third direction of the second leveling plate, the second member holding the first leveling plate and the second leveling plate, which are provided in an alternating manner, between itself and the first member.

As a result of this, when leveling plates are disposed in an alternating manner, each leveling plate comes into contact with each other at its end protrusion. For that reason, by appropriately setting the distance between the area supporting the leveling plate and each end protrusion, it becomes possible to reduce change of lever ratio even if the leveling plate inclines with respect to the second member. Therefore, it is possible to suppress change of lever ratio even if the inclination of the leveling plate occurs associated with change in the distance between the first surface and the second surface.

Moreover, in a thrust bearing device which uses this leveling plate, a plurality of leveling plates are disposed in the circumferential direction surrounding the rotary shaft. Therefore, the leveling plates disposed in the circumferential direction come into contact with each other with their end protrusions intersecting with each other. That is, the end protrusions come into contact at a point when they are regarded as rigid bodies, and come into contact at a minute elliptic contact surface when they are regarded as elastic bodies. Further, central axes of respective end protrusions in one leveling plate are parallel with each other. For that reason, even if the postures of the leveling plates change in association with change in the distance between the first surface and the second surface, thus causing the contact position between the leveling plates to change, change of lever ratio hardly occurs. As a result of this, load applied to a contact portion of leveling plate becomes approximately constant even if the distance between the first surface and the second surface changes. Therefore, even if the number of leveling plates is increased, it is possible to improve the uniformity of load applied to each supporting member. Thus, when a thrust pad is used as the each supporting member, even if the number of pieces of the thrust pad is increased, it is possible to bear the load uniformly by each thrust pad, thus reducing a risk of local seizure of the thrust pad.

DETAILED DESCRIPTION OF THE PREFERRED EMBODIMENTS

Hereinafter, embodiments of a leveling plate and a thrust bearing device will be described based on the drawings.

Figure 2:
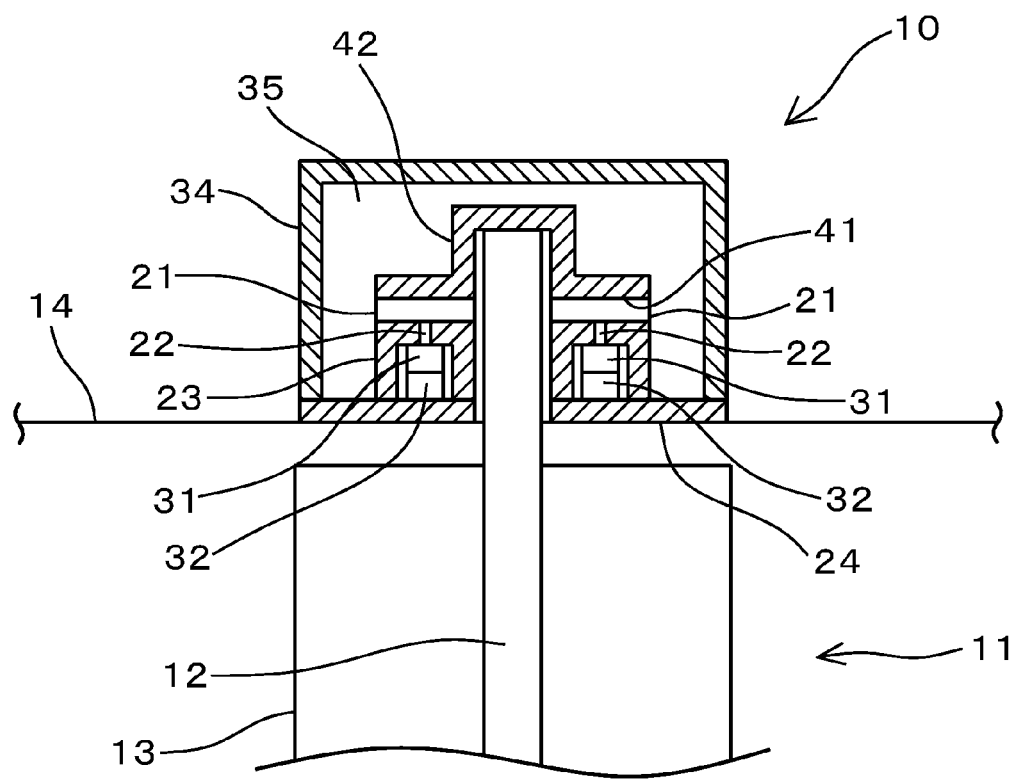
FIG. 2 is a schematic diagram to show an outline configuration of a rotary mechanical device to which a thrust bearing device according to one embodiment is applied.

A thrust bearing device 10 shown in FIG. 2 is used as a bearing for a rotary mechanical device 11. The rotary mechanical device 11 includes a rotary body 13 which rotates about a rotary shaft member 12, such as an electric generator, a pump, and a turbine. The rotary mechanical device 11 can be applied, without being limited to these examples, to any instrument provided it rotates about the rotary shaft member 12. The rotary mechanical device 11 includes the rotary shaft member 12 which acts as the center of rotation. This rotary shaft member 12 extends substantially vertically in the gravitational direction. The thrust bearing device 10 is secured to a floor 14 of arrangement and supports the rotary mechanical device 11 in a suspended state. It is noted that the thrust bearing device 10 may be configured to support the rotary mechanical device 11 from a lower end side of the rotary shaft member 12. Moreover, the configuration may be such that the axial direction of the rotary shaft member 12 extends in a direction different from the gravitation direction, for example, a horizontal direction.

Figure 1:
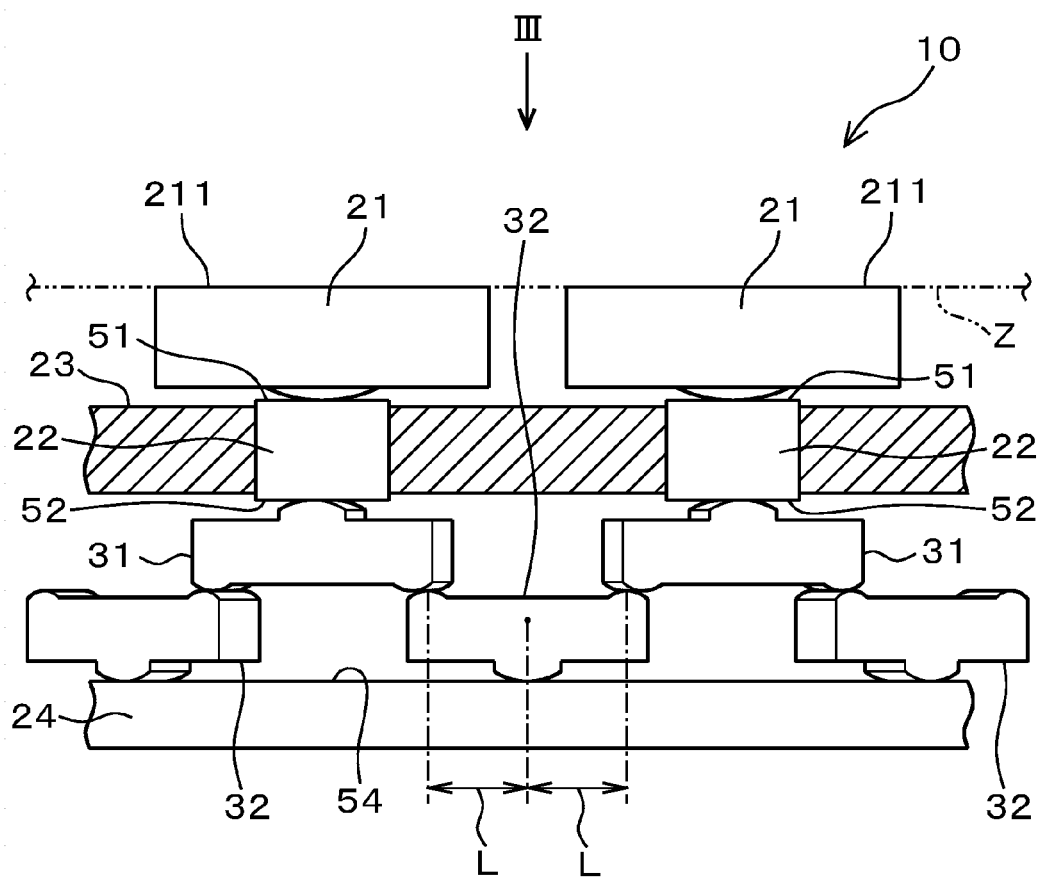
FIG. 1 is a schematic diagram to show the configuration of a thrust bearing device including a leveling plate according to one embodiment.
Figure 3:
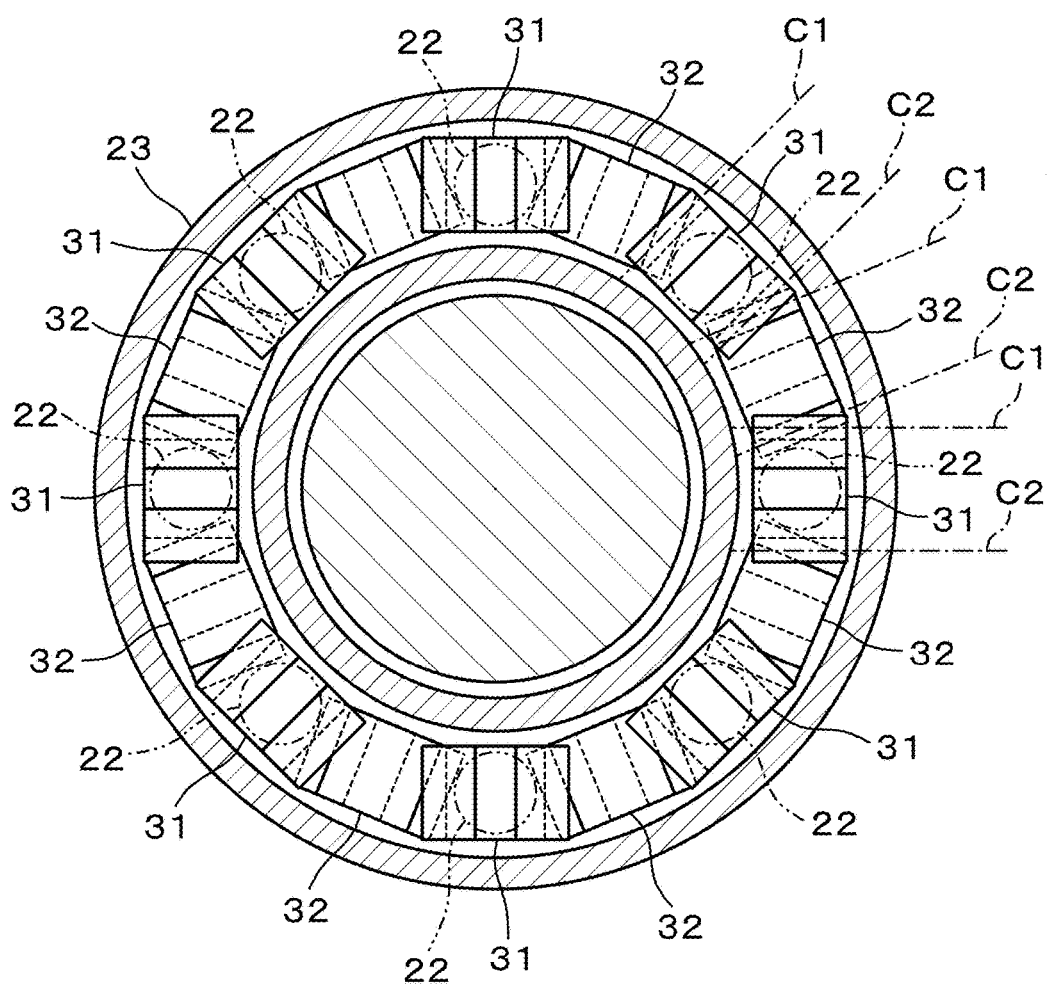
FIG. 3 is a sectional view of a leveling plate accommodated in a carrier ring viewed from an arrow III direction of FIG. 1.

The thrust bearing device 10 for the rotary mechanical device 11 includes, as shown in FIGS. 1 to 3, a thrust pad 21, a pillar 22, a carrier ring 23, a back plate 24, a first leveling plate 31, and a second leveling plate 32. The thrust pad 21, the pillar 22, the carrier ring 23, the back plate 24, the first leveling plate 31, and the second leveling plate 32 are integrally assembled together. In the present embodiment, the first leveling plate 31 and the second leveling plate 32 are accommodated in the annular carrier ring 23 as shown in FIG. 3. As a result of this, the first leveling plate 31 and the second leveling plate 32 are limited in radial movement by the carrier ring 23. The thrust pad 21 is provided in multiple numbers, for example, 4 to 16 pieces, in the circumferential direction centering on the rotary shaft member 12. It is noted that the number of pieces of the thrust pad 21 can be arbitrarily specified according to the rotary mechanical device 11 to which it is applied. The thrust pad 21, the pillar 22, the carrier ring 23, the back plate 24, the first leveling plate 31 and the second leveling plate 32, which are assembled together, are accommodated in a casing 34 together with a thrust collar 42 having a sliding surface 41, etc. The casing 34 forms an oil chamber 35 between itself and the back plate 24. The oil chamber 35 is filled with lubricant oil which lubricates between the thrust pad 21 and the thrust collar 42. The thrust bearing device 10 may not be configured such that the oil chamber 35 to be filled with lubricant oil is formed, and may be configured such that oil is appropriately supplied between the thrust pad 21 and the thrust collar 42.

The first leveling plate 31 and the second leveling plate 32 is limited in movement in the circumferential direction by a pin member not shown and protruding radially from the carrier ring 23, or the like. It is noted that the configuration may be such that first leveling plate 31 and the second leveling plate 32 are limited in movement in the radial and circumferential directions by, in place of the carrier ring 23 and the pin member not shown, for example, a pin member extending from the back plate 24 in the axial direction of the rotary shaft member 12.

The thrust pad 21 slides with the thrust collar 42, which is integrally provided with the rotary shaft member 12 of the rotary mechanical device 11 as shown in FIG. 2, via an oil film. The thrust collar 42 rotates integrally with the rotary shaft member 12 and has a sliding surface 41 on the lower end side thereof in FIG. 2. The thrust pad 21 has a sliding surface 211 opposed to the sliding surface 41 on the upper end side thereof in FIGS. 1 and 2. The pillar 22 is provided on the inner side of the carrier ring 23 so as to be movable in the axial direction of the rotary shaft member 12, that is, in the vertical direction of FIGS. 1 and 2. The carrier ring 23 accommodates the pillar 22 which moves up and down. The first leveling plate 31 and the second leveling plate 32 are accommodated between the pillar 22 accommodated in the carrier ring 23, and the back plate 24. The back plate 24 is secured to the floor 14 of the arrangement. The carrier ring 23 is secured to the back plate 24. It is noted that the carrier ring 23 may be configured integrally with the back plate 24.

As a result of such configuration, the first leveling plate 31 and the second leveling plate 32 are held between the end surface on the back plate 24 side of the pillar 22 and the end surface on the thrust pad 21 side of the back plate 24 as shown in FIG. 1. The pillar 22 has a pad surface 51 and a plate surface 52. The pad surface 51 and the plate surface 52 are provided on respective ends in the axial direction of the pillar 22. That is, the pad surface 51 of the pillar 22 is in contact with the end on the back plate 24 side of the thrust pad 21 in which inclination occurs. Moreover, the plate surface 52 of the pillar 22 is in contact with the end on the thrust pad 21 side of the first leveling plate 31 in which inclination occurs. As a result of this, the thrust pad 21 is in indirect contact with the first leveling plate 31 with the pillar 22 being interposed therebetween. In the case of the present embodiment, the plate surface 52 of the pillar 22 corresponds to the first surface, and the pillar 22 corresponds to the first member. It is noted that the thrust pad 21 may be configured to be in direct contact with the first leveling plate 31 without the pillar 22 being held therebetween.

The back plate 24 has an end surface 54 on the thrust pad 21 side. The end surface 54 of the back plate 24 is in contact with the end on the back plate 24 side of the second leveling plate 32. In the case of the present embodiment, the end surface 54 of the back plate 24 corresponds to the second surface, and the back plate 24 corresponds to the second member. Further, the plate surface 52 of the pillar 22 corresponding to the first surface and the end surface 54 of the back plate 24 corresponding to the second surface are configured to be parallel. That is, the first leveling plate 31 and the second leveling plate 32 are held between the plate surface 52 of the pillar 22 and the end surface 54 of the back plate 24 which is parallel with the plate surface 52. As in the present embodiment, the thrust bearing device 10 includes a pillar 22 which is interposed between the thrust pad 21 and the first leveling plate 31. Using this pillar 22 makes it easy to maintain the plate surface 52 which is the first surface and the end surface 54 which is the second surface being parallel with each other. For that reason, in the aspect of suppressing change in lever ratio, it is preferable to use the pillar 22 between the thrust pad 21 and the first leveling plate 31.

Next, the first leveling plate 31 and the second leveling plate 32 having the above described configuration will be described. In the case of the present embodiment, the first leveling plate 31 and the second leveling plate 32 are formed into the same shape. Therefore, the first leveling plate 31 and the second leveling plate 32 are described as a leveling plate 60.

Figure 4:
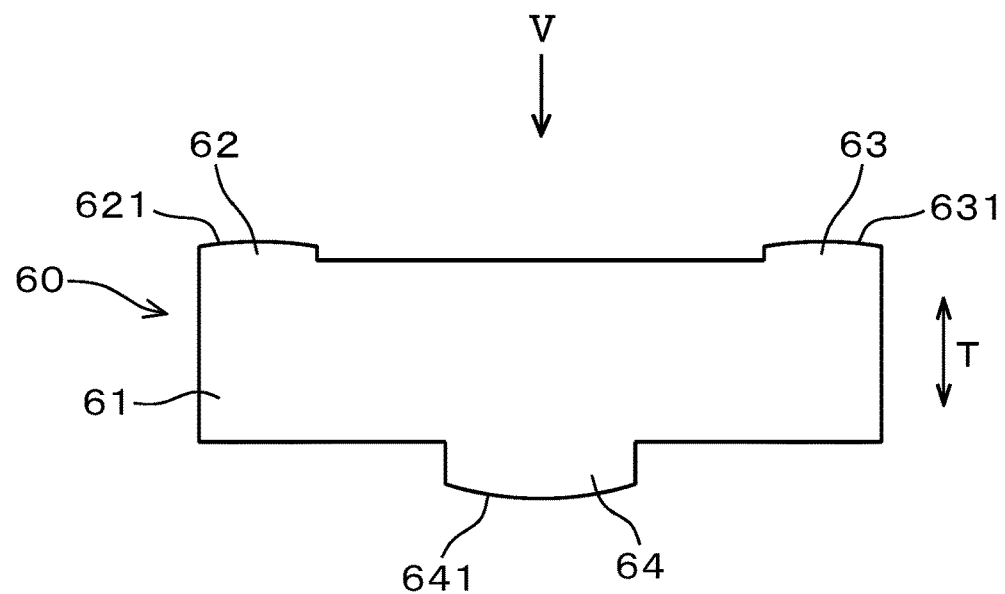
FIG. 4 is a schematic diagram to show a leveling plate according to one embodiment.
Figure 5:
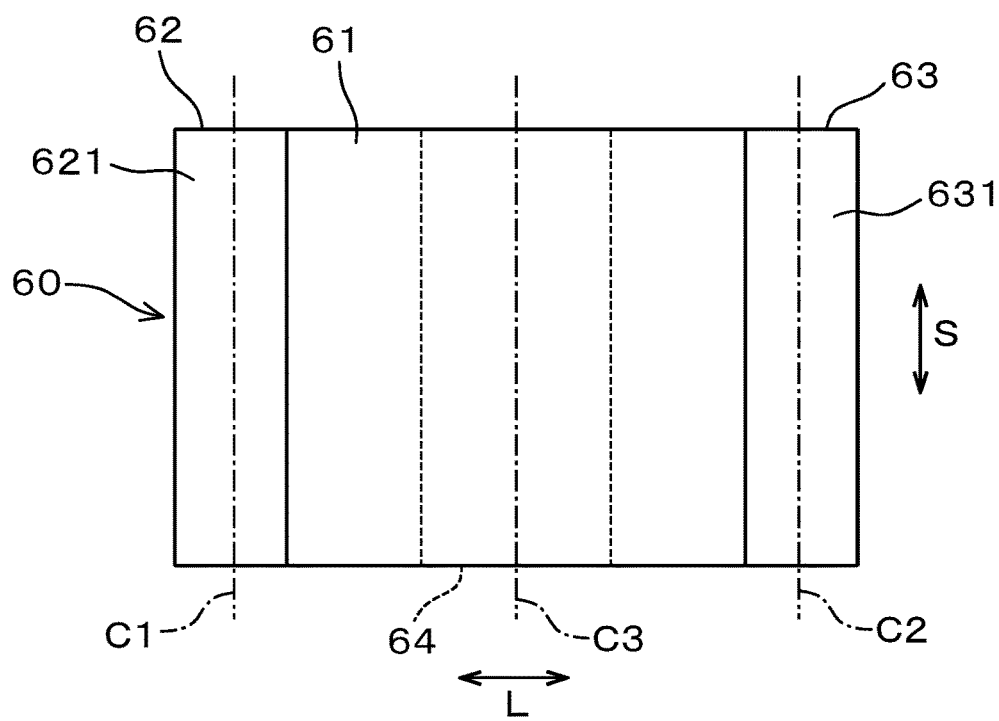
FIG. 5 is a sectional view viewed from an arrow V direction of FIG. 4.

The leveling plate 60 is formed of, for example, steel and includes a main body 61, an end protrusion 62, an end protrusion 63, and an intermediate protrusion 64 as shown in FIGS. 4 and 5. In the present embodiment, the leveling plate 60 is configured such that the end protrusion 62, the end protrusion 63, and the intermediate protrusion 64 are formed integrally with the main body 61. The main body 61 is specified to be a plate-like three-dimensional shape which has a longer side direction as the first direction, a shorter side direction as the second direction, and a thickness direction as the third direction. The main body 61 may be specified to have, without being limited to a rectangular shape as shown in FIGS. 4 and 5, a polygonal shape having not less than 5 sides, a fan shape, or the like. The leveling plate 60 of the present embodiment shown in FIGS. 4 and 5 has a surface extending in a longer side direction L and a shorter side direction S in the main body 61, in which the longer side direction L, the shorter side direction S, and thickness direction T are perpendicular to each other. Moreover, the leveling plate 60 includes an end protrusion 62 and an end protrusion 63 at both ends in the longer side direction L of the main body 61. That is, the end protrusion 62 and the end protrusion 63 are provided respectively at both ends in the longer side direction L of the main body 61. In this case, the end protrusion 62 and the end protrusion 63 can be provided at an arbitrary position without being limited to at a tip end, provided it is an end part excepting intermediate portions of the main body 61. That is, the end protrusion 62 and the end protrusion 63 may be provided closer to the middle than in the example shown in FIGS. 4 and 5. In the aspect of increasing the degree of freedom of designing the range of displacement in inclination, the end protrusion 62 and the end protrusion 63 are preferably provided closest to the ends in the longer side direction. The end protrusion 62 and the end protrusion 63 protrude from the main body 61 in the thickness direction T of the main body 61. Further, the end protrusion 62 has a protruded end surface which is formed into a circumferential surface in a section perpendicular to the shorter side direction S. That is, the end protrusion 62 has an end circumferential surface 621. Similarly, the end protrusion 63 has a protruding end surface formed in a circumferential surface shape. That is, the end protrusion 63 has an end circumferential surface 631. The end protrusion 62 and the end protrusion 63 may be configured to have the same shape. A central axis C1 at which the end circumferential surface 621 of the end protrusion 62 is centered and a central axis C2 at which the end circumferential surface 631 of the end protrusion 63 is centered both extend in the shorter side direction S of the main body 61. Further, the central axis C1 of the end circumferential surface 621 and central axis C2 of the end circumferential surface 631 are specified to be parallel with each other. That is, the end protrusion 62 having the end circumferential surface 621 and the end protrusion 63 having the end circumferential surface 631 are configured such that the central axis C1 and the central axis C2 thereof are parallel with each other. Thus, the end circumferential surface 621 is a circumferential surface which is centered at the central axis C1. Similarly, the end circumferential surface 631 is a circumferential surface which is centered at the central axis C2. These circumferential surfaces 621 and 631 can be configured to have the same diameter over the entire length thereof in the direction in which the central axes C1 and C2 extend.

The leveling plate 60 of the present embodiment includes the intermediate protrusion 64 between the end protrusion 62 and the end protrusion 63 in the longer side direction L of the main body 61. The intermediate protrusion 64 acts as a fulcrum of the leveling plate 60 which inclines. The intermediate protrusion 64 protrudes from the main body 61 to the opposite side of the end protrusion 62 and the end protrusion 63. Further, the intermediate protrusion 64 is configured such that the protruded end has an outer edge of arc shape in a section perpendicular to the shorter side direction S. That is, the intermediate protrusion 64 has an intermediate circumferential surface 641. A central axis C3 at which the intermediate circumferential surface 641 is centered extends in the shorter side direction S of the main body as in the case of the end circumferential surface 621 and the end circumferential surface 631. Further, the central axis C3 at which the intermediate circumferential surface 641 is centered is specified to be parallel with the central axis C1 of the end circumferential surface 621 and the central axis C2 of the end circumferential surface 631. That is, the intermediate protrusion 64 having the intermediate circumferential surface 641, and the end protrusions 62 and 63 having the end circumferential surfaces 621 and 631 are configured such that the central axes C1, C2 and C3 of each thereof are parallel with each other. Moreover, in the present embodiment, the two end protrusions 62 and 63 are provided in symmetrically across the intermediate protrusion 64. That is, the distance from the central axis C3 of the intermediate protrusion 64 to the central axis C1 of the end protrusion 62 is the same as the distance from the central axis C3 of the intermediate protrusion 64 to the central axis C2 of the end protrusion 63.

Figure 6:
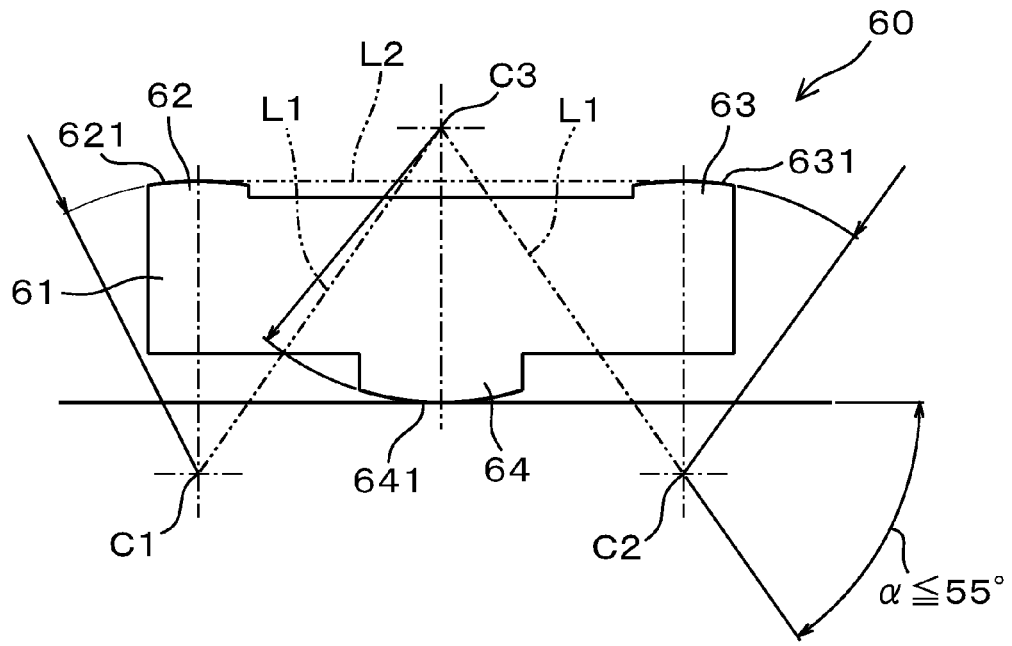
FIG. 6 is a schematic diagram to show a leveling plate according to one embodiment.

Here, as shown in FIG. 6, imaginary lines connecting the central axis C3 of the intermediate circumferential surface 641 with the central axis C1 of the end circumferential surface 621 and the central axis C2 of the end circumferential surface 631 are defined as a line L1, respectively. As described above, the end circumferential surface 621 and the end circumferential surface 631 are provided symmetrically across the intermediate circumferential surface 641. As a result of that the line L1 to the end circumferential surface 621 and the line L1 to the end circumferential surface 631 are the same in length. Moreover, an imaginary line which is tangent to tip ends of the end protrusion 62 and the end protrusion 63 in the thickness direction T of the main body 61 is defined as a line L2. The line L2 corresponds to a tangential line common to both the end circumferential surface 621 of the end protrusion 62 and the end circumferential surface 631 of the end protrusion 63. In the present embodiment, having defined the line L1 and the line L2 in this way, an angle α formed by the line L1 and the line L2 is specified as $\alpha \leq 550°$.

Figure 7:
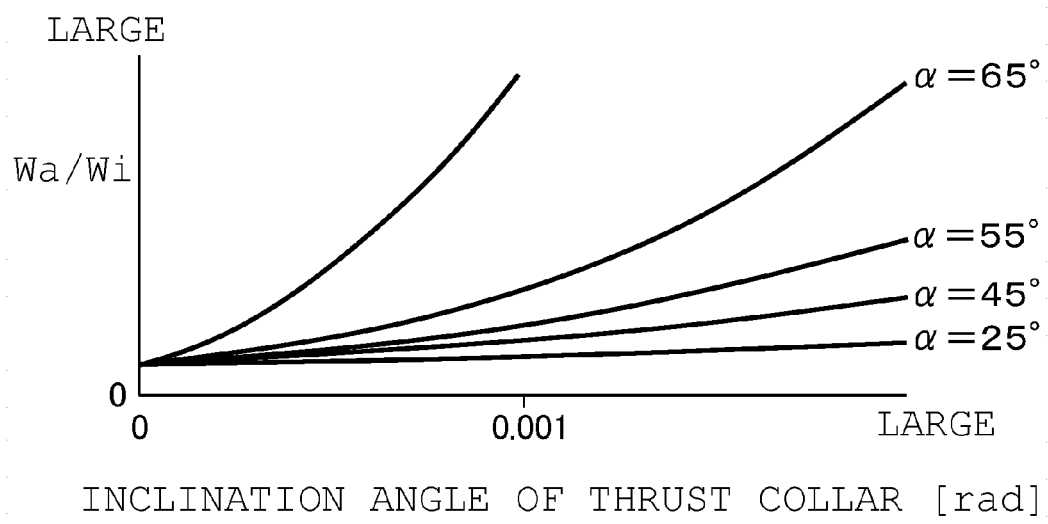
FIG. 7 is a schematic diagram to show a relationship between an inclination angle of thrust collar and a ratio of load.
Figure 8:
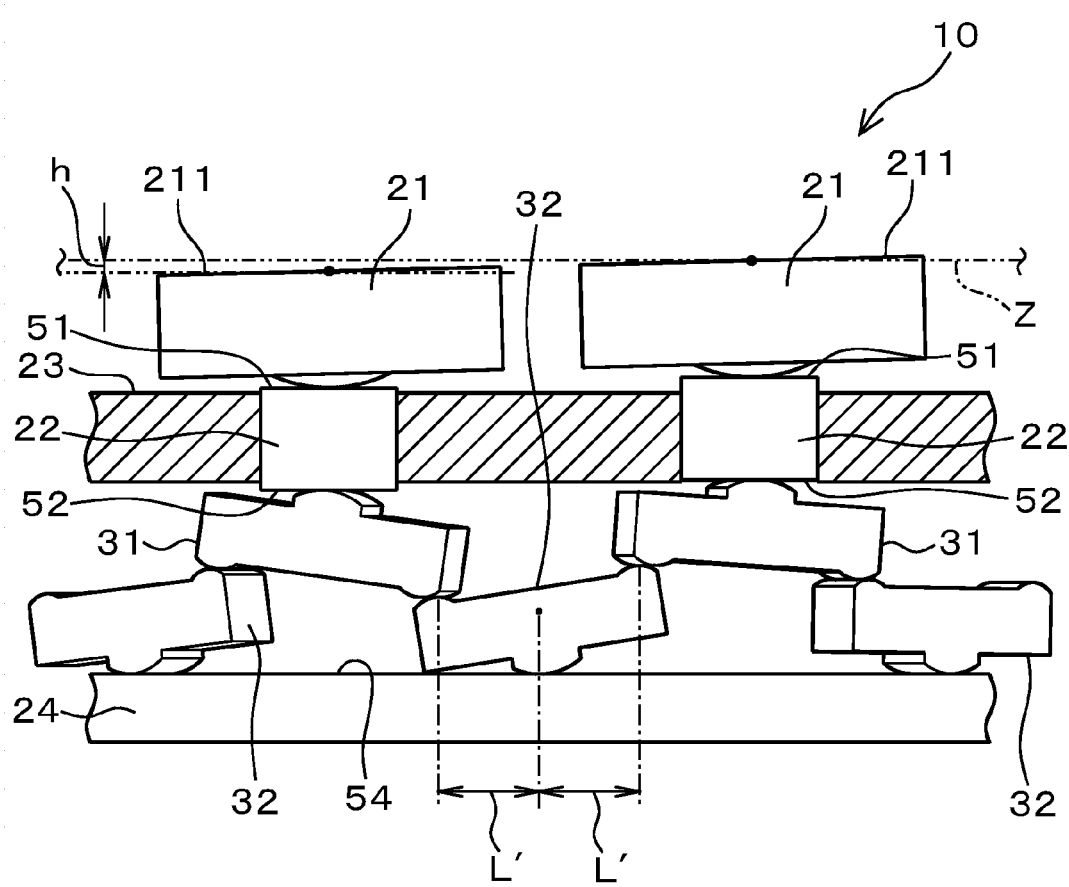
FIG. 8 is a schematic diagram to show an example in which displacement difference h has occurred between thrust pads in FIG. 1.

FIG. 7 shows a relationship between an inclination angle of the thrust collar 42 in contact with a thrust pad 21, and load applied to the thrust pad 21 in a thrust bearing device 10 including 14 pieces of thrust pads 21. When no inclination has occurred in the thrust collar 42, which is integrally provided with the rotary shaft member 12, with respect to the axial direction thereof, the sliding surfaces 211 of a plurality of thrust pads 21 exhibit no deviation of position in the vertical direction of FIG. 1, and has a uniform height Z as shown in FIG. 1. On the other hand, when inclination occurs in the rotary shaft member 12 and the thrust collar 42 with respect to the axial direction thereof due to, for example, lack of processing accuracy in the rotary mechanical device 11 and deflection of the rotary shaft member 12, deviation of a displacement difference h occurs in the vertical direction of FIG. 1 between the plurality of thrust pads 21 as shown in FIG. 8. In this case, it is seen that as the angle of inclination of the thrust collar 42 etc. increases, the displacement difference h increases. FIG. 8 shows an example in which a displacement difference h has occurred between thrust pads 21. The deviation of position corresponding to the displacement difference h of the thrust pad 21 causes the first leveling plate 31 and the second leveling plate 32 to be inclined via the pillar 22. Further, deviation of position between the plurality of thrust pads 21 causes imbalance of load applied to each thrust pad 21 so that as the displacement difference h increases, that is, the angle of inclination of the thrust collar 42 increases, the value of a ratio Wa/Wi of a maximum value Wa of load applied to the thrust pad 21 and a minimum value Wi of the load increases. That is, when a displacement difference h occurs in the thrust pad 21 due to inclination of the thrust collar 42, a difference occurs in the load applied to each thrust pad 21. It is seen clearly from FIG. 7 that when the leveling plate 60 of the present embodiment is used, the value of the load ratio Wa/Wi prominently decreases compared with a case when a leveling plate of prior art which comes into linear contact is used. Further, when the angle $\alpha$ is $\alpha \leq 55°$, the value of load ratio Wa/Wi decreases more prominently compared with when $55° < \alpha$, as shown in FIG. 7. Accordingly, in the present embodiment, the angle is specified as $\alpha \leq 55°$.

Figure 9:
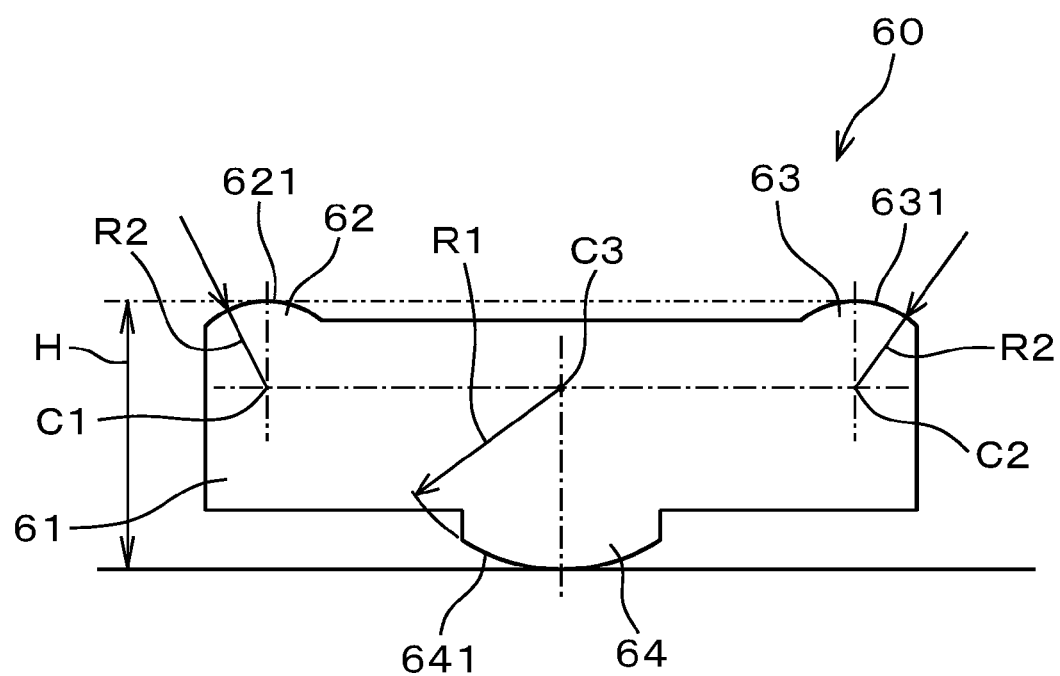
FIG. 9 is a schematic diagram to show a preferred embodiment of a leveling plate according to one embodiment.

Further, as shown in FIG. 9, a radius of the intermediate circumferential surface 641 is let to be R1, and radii of the two end circumferential surfaces 621 and 631 be R2. Then, a distance from a tip end of the intermediate protrusion 64 to tip ends of the end protrusions 62 and 63 is let to be H in the thickness direction of the main body 61. In this occasion, it is preferable that $$R1+R2=H \qquad \text{Condition 1}$$

In this case, it becomes that the imaginary lines L1 and L2 are parallel with each other, that is, $\alpha=0°$. In other words, the central axis C3 of the intermediate circumferential surface 641 and the two central axes C1 and C3 of the end circumferential surfaces 621 and 631 lie on the same plane.

Next, the disposition of the leveling plate 60 in the thrust bearing device 10 will be described.

The first leveling plate 31 and the second leveling plate 32, which use the leveling plate 60, are disposed in the circumferential direction inside the carrier ring 23 as shown in FIG. 3. In this case, the first leveling plate 31 and the second leveling plate 32 are disposed in an alternating manner as shown in FIG. 1. To be specific, the first leveling plate 31, which is located on the thrust pad 21 side, is disposed with the intermediate protrusion 64 being on the thrust pad 21 side, and the end protrusion 62 and the end protrusion 63 being on the back plate 24 side. On the other hand, the second leveling plate 32, which is located on the back plate 24 side, is disposed with the intermediate protrusion 64 being on the back plate 24 side and the end protrusion 62 and the end protrusion 63 being on the thrust pad 21 side. The first leveling plate 31 and the second leveling plate 32 are alternately disposed in the circumferential direction. This results in that the end protrusions 62 and 63 of the first leveling plate 31 and the end protrusions 62 and 63 of the second leveling plate 32 will come into contact with each other.

Further, the first leveling plate 31 and the second leveling plate 32 are disposed in the circumferential direction of the rotary shaft member 12. For that reason, the central axis C3 of the intermediate protrusion 64 of the first leveling plate 31 and the central axis C3 of the intermediate protrusion 64 of the second leveling plate 32 are both disposed radially so as to be oriented toward the center of the rotary shaft member 12. In contrast to this, the central axis C1 of the end protrusion 62 and the central axis C2 of the end protrusion 63 of the first leveling plate 31 are parallel with the central axis C3 of the intermediate protrusion 64, and the central axis C1 of the end protrusion 62 and the central axis C2 of the end protrusion 63 of the first leveling plate 32 are parallel with the central axis C3 of the intermediate protrusion 64. For that reason, the end protrusions 62 and 63 of the first leveling plate 31, and the end protrusions 62 and 63 of the second leveling plate 32 are in contact with each other in an intersecting manner as shown in FIG. 3. That is, the end protrusions 62 and 63 of the first leveling plate 31, and the end protrusions 62 and 63 of the second leveling plate 32 are in contact with each other not in a linear manner but only in an intersecting portion. Here, if the first leveling plate 31 and the second leveling plate 32 are regarded as rigid bodies, the contact portion will be a point, and if the first leveling plate 31 and the second leveling plate 32 are regarded as elastic bodies, the contact portion will have a minute elliptic shape, exhibiting a pressure distribution which is in point symmetry about the center of the contact portion.

In this way, in the case of the present embodiment, the end protrusions 62 and 63 of the first leveling plate 31, and the end protrusions 62 and 63 of the second leveling plate 32 are in contact with each other in an intersecting manner.

Next, actions of the thrust bearing device 10 according to the above described configuration will be described.

As shown in FIG. 1, when located at an appropriate position to be referenced, all of the sliding surfaces 211 of a plurality of thrust pads 21 lie on the same plane. In the case of the present embodiment, the two end protrusions 62 and 63 are provided symmetrically across the intermediate protrusion 64. For that reason, in each case of the first leveling plate 31 and the second leveling plate 32, which use the leveling plate 60, a lever ratio L:L becomes L:L=1:1. As a result of this, when a load F is applied from the thrust pad 21, each contact portion between the first leveling plate 31 and the second leveling plate 32 is subjected to one half of the quantity of the load F, respectively. Thus, each of the first leveling plate 31 and the second leveling plate 32 will bear the load F in sum total.

Here, when a displacement difference h as shown in FIG. 8 occurs between thrust pads 21, the first leveling plate 31 and the second leveling plate 32 incline with respect to the end surface 54 to absorb the displacement difference h. In the present embodiment, even when the first leveling plate 31 and the second leveling plate 32 have thus inclined, the lever ratio L':L' is maintained as L':L'=1:1. That is, especially when the above described condition 1 is satisfied, the lever ratio of the leveling plate 60 will not change. To be specific, when the above described condition 1 is satisfied, even if the distance between the plate surface 52 and the end surface 54 is changed due to a displacement of the thrust pad 21, thereby causing the first leveling plate 31 and the second leveling plate 32 to incline, the lever ratio will not change. For that reason, each contact portion between the first leveling plate 31 and the second leveling plate 32 will be subjected to an equal load respectively regardless of the inclination thereof. That is, the first leveling plate 31 and the second leveling plate 32 always bear a constant load even when inclination occurs in association with a displacement difference h between the thrust pads 21. As a result of that, even when a displacement difference h occurs between a plurality of thrust pads 21, all of the thrust pads 21 bear an equal amount of load, thus allowing to uniformize the load in the plurality of thrust pads 21.

As a result of this, even if the thrust collar 42 inclines, inequality of the load applied to each thrust pad 21 is avoided. Moreover, even if difference in thickness has occurred among a plurality of thrust pads 21 in the axial direction of the rotary shaft member 12, inequality of the load applied to each thrust pad 21 will be avoided. Further, even when the number of pieces of the thrust pads 21 is increased, the load to be applied to each thrust pad 21 will be uniformized.

The leveling plates 60 according to one embodiment described so far come into contact with each other at the end protrusions 62 and 63 when they are disposed in the circumferential direction in an alternating manner as the first leveling plate 31 and the second leveling plate 32. Then, in one embodiment, an intermediate protrusion 64 which acts as a fulcrum of inclination of the first leveling plate 31 and the second leveling plate 32 is provided between the end protrusion 62 and the end protrusion 63. Therefore, by appropriately specifying the distance between the intermediate protrusion 64 and the end protrusions 62 and 63, change in the so-called lever ratio will be reduced even if the first leveling plate 31 and the second leveling plate 32 incline. Accordingly, even if a displacement difference h occurs between members supported by the leveling plate 60, or even if a difference in thickness has occurred between the members supported by the leveling plate 60, it is possible to uniformize the distribution of the load in the contact portions between the leveling plates.

Especially, in the thrust bearing device 10 which utilizes the leveling plate 60 as the first leveling plate 31 and the second leveling plate 32, the first leveling plate 31 and the second leveling plate 32 are disposed in the circumferential direction in which the first leveling plate 31 and the second leveling plate 32 surround the rotary shaft member 12. Here, the leveling plate 60 which constitutes the first leveling plate 31 and the second leveling plate 32 is configured such that the central axis C3 of the intermediate protrusion 64 is provided in parallel with the central axis C1 of the end protrusion 62 and the central axis C2 of the end protrusion 63. For that reason, the first leveling plate 31 and the second leveling plate 32, which are disposed in the circumferential direction, come into contact with each other in a state that the end protrusions 62, 63 intersect with each other. That is, the end protrusions 62, 63 come into contact at a point when they are regarded as rigid bodies, and come into contact at a minute elliptic contact surface when regarded as elastic bodies. Moreover, even if the postures of the first leveling plate 31 and the second leveling plate 32 change as the position of the thrust pad 21 changes, change of lever ratio will hardly occur. As a result of this, each load applied to each contact portion between the first leveling plate 31 and the second leveling plate 32 stays substantially constant even if the position of the thrust pad 21 changes. Therefore, even if the number of pieces of the thrust pads 21 increases, it is possible to bear load uniformly by each thrust pad 21, thereby reducing a risk of local seizure of the thrust pad 21 and damages associated therewith.

In a leveling plate 60 of one embodiment, the angle $\alpha$ which is formed by an imaginary lines L1 and L2 is specified as $\alpha \leq 55°$. Specifying the angle $\alpha$ in such a way will result in decrease in difference between loads applied to the plurality of thrust pads 21 even when the inclination of the thrust collar 42 in the axial direction thereof increases. Therefore, it is possible to reduce a risk of local seizure of the thrust pad 21, and damages associated therewith. Especially, as the angle $\alpha$ is made smaller, difference between loads applied to each thrust pads 21 can be made smaller. That is, as the angle $\alpha$ is made smaller, the uniformity of load applied to each thrust pad 21 to be supported is improved.

In the leveling plate 60 of one embodiment, when letting the distance from the tip end of the intermediate protrusion 64 to the tip end of the end protrusions 62, 63 be H in the thickness direction of the main body 61, there is an established relationship of R1+R2=H between the radius R1 of the intermediate circumferential surface 641 and the radius R2 of the end circumferential surfaces 621 and 631. In this occasion, the angle $\alpha$ becomes $\alpha=0°$. When the angle $\alpha$ is made to be $\alpha=0°$, the lever ratio of the leveling plate 60 becomes constant regardless of the inclination of the leveling plate 60. For that reason, even if the first leveling plate 31 and the second leveling plate 32, which use the leveling plate 60, incline due to change of the position of the thrust pad 21, the load from the thrust pad 21 is born equally by the first leveling plate 31 and the second leveling plate 32. As a result of that, even if the thrust collar 42 is inclined in the axial direction thereof and the position of the thrust pad 21 changes, load during sliding is born equally by a plurality of thrust pads 21. Therefore, even if the number of pieces of the thrust pad 21 increases, it is possible to bear load uniformly by each thrust pad 21, thereby reducing a risk of local seizure of the thrust pad 21, and damages associated therewith.

The present embodiment described so far is not limited to the above described embodiment, and may be applied to various embodiments within a range not departing from the spirit thereof.

In the above described embodiment, the leveling plate 60 includes the intermediate protrusion 64 integrally with the end protrusion 62 and the end protrusion 63. However, the leveling plate 60 does not necessarily need to integrally include the intermediate protrusion 64. In the case of the first leveling plate 31, the intermediate protrusion 64 comes into contact with the plate surface 52 of the pillar 22 which is the first member. This allows the first leveling plate 31 to incline with the intermediate protrusion 64 being as a fulcrum. Further, in the case of the second leveling plate 32, the intermediate protrusion 64 comes into contact with the end surface 54 of the back plate 24 which is the second member. This allows the second leveling plate 32 to incline with the intermediate protrusion 64 being as a fulcrum. In this way, the first leveling plate 31 and the second leveling plate 32 both incline by making the intermediate protrusion 64 act as a fulcrum. Accordingly, the portion corresponding to the intermediate protrusion 64 does not necessarily be included in the leveling plate 60. For example, in the case of the first leveling plate 31, a portion corresponding to the intermediate protrusion, which protrudes toward the first leveling plate 31 may be provided, in the pillar 22. In this case, the protrusion which protrudes from the pillar 22 comes into contact with a surface of the main body 61 on the opposite side of the end protrusion 62 and the end protrusion 63 in the thickness direction of the first leveling plate 31. The first leveling plate 31 comes into contact with the protrusion, which protrudes from the pillar 22 so as to be permitted to incline centering on a position on its surface equidistance from the end protrusion 62 and the end protrusion 63. Similarly, in the case of the second leveling plate 32, a portion corresponding to the intermediate protrusion, which protrudes toward the second leveling plate 32, may be provided on the back plate 24. In this case, the protrusion which protrudes from the back plate 24 comes into contact with a surface of the main body 61 on the opposite side of the end protrusion 62 and the end protrusion 63 in the thickness direction of the second leveling plate 32. The second leveling plate 32 comes into contact with the protrusion, which protrudes from the back plate 24, so as to be permitted to incline centering on a position on its surface equidistance from the end protrusion 62 and the end protrusion 63. As described so far, the configuration may be such that the portion corresponding to the intermediate protrusion 64 may be separated from the leveling plate 60 and provided on a counterpart member opposed to the leveling plate 60. In these cases, the end surface of the portion which protrudes from the pillar 22 or the back plate 24 has a tip end surface which corresponds to the intermediate circumferential surface 641. For that reason, the end surface of the portion which protrudes from the pillar 22 corresponds to the intermediate circumferential surface 641 and to the first surface at the same time. Moreover, the end surface of the portion which protrudes from the back plate 24 corresponds to the intermediate circumferential surface 641 and to the second surface at the same time.

What is claimed is:

1. A leveling plate, comprising:
    a main body including a surface extending in first and second directions orthogonal to each other;
    an end protrusion which is provided respectively at both ends of the main body in the first direction, and protrudes from the main body in a third direction perpendicular to the surface, the end protrusion having an end circumferential surface whose central axis extends in the second direction of the main body; and
    an intermediate protrusion which is provided between the end protrusions of the main body in the first direction, and protrudes from the main body to an opposite side of the end protrusions in the third direction, the intermediate protrusion having an intermediate circumferential surface whose central axis extends in the second direction of the main body;
    wherein letting an imaginary line connecting a central axis of the intermediate circumferential surface with a central axis of the end circumferential surface be a line L1, and an imaginary line which is tangent to each tip end of the end protrusions be a line L2 in a section perpendicular to the central axis of the end protrusion, an angle α formed by the line L1 and the line L2 is α≤55°.

2. A thrust bearing device, comprising:
    a first leveling plate and a second leveling plate, the first and second leveling plates comprising the leveling plate according to claim 1;
    the second leveling plate being disposed so as to be inverted about the third direction with respect to the first leveling plate and to alternate with the first leveling plate;
    a first member having a first surface which comes into contact with an area on an opposite side of the end protrusion in the third direction of the first leveling plate; and
    a second member having a second surface which is provided in parallel with the first surface and comes into contact with an area on an opposite side of the end protrusion in the third direction of the second leveling plate, the second member holding the first leveling plate and the second leveling plate, which are provided in an alternating manner, between the second member and the first member.

3. The thrust bearing device according to claim 2, wherein the first leveling plate and the second leveling plate are in contact in a state that central axes of the end protrusions of the first leveling plate are non-parallel with central axes of the end protrusions of the second leveling plate.

4. A rotary mechanical device, comprising:
    a rotary body which rotates about a center of a shaft member; and
    the thrust bearing device according to claim 2, which supports the rotary body in an axial direction.

5. The leveling plate according to claim 1, wherein the end protrusions are provided symmetrically across the intermediate protrusion, and extend in parallel with the intermediate protrusion.

6. A thrust bearing device, comprising:
    a first leveling plate and a second leveling plate, the first and second leveling plates comprising the leveling plate according to claim 5;
    the second leveling plate being disposed so as to be inverted about the third direction with respect to the first leveling plate and to alternate with the first leveling plate;
    a first member having a first surface which comes into contact with an area on an opposite side of the end protrusion in the third direction of the first leveling plate; and
    a second member having a second surface which is provided in parallel with the first surface and comes into contact with an area on an opposite side of the end protrusion in the third direction of the second leveling plate, the second member holding the first leveling plate and the second leveling plate, which are provided in an alternating manner, between the second member and the first member.

7. The thrust bearing device according to claim 6, wherein the first leveling plate and the second leveling plate are in contact in a state that central axes of the end protrusions of the first leveling plate are non-parallel with central axes of the end protrusions of the second leveling plate.

8. A rotary mechanical device, comprising:
    a rotary body which rotates about a center of a shaft member; and
    the thrust bearing device according to claim 6, which supports the rotary body in an axial direction.

9. A leveling plate, comprising:
    a main body including a surface extending in first and second directions orthogonal to each other;
    an end protrusion which is provided respectively at both ends of the main body in the first direction, and protrudes from the main body in a third direction perpendicular to the surface, the end protrusion having an end circumferential surface whose central axis extends in the second direction of the main body; and
    an intermediate protrusion which is provided between the end protrusions of the main body in the first direction, and protrudes from the main body to an opposite side of the end protrusions in the third direction, the intermediate protrusion having an intermediate circumferential surface whose central axis extends in the second direction of the main body;
    wherein letting a radius of the intermediate circumferential surface be R1, a radius of the end circumferential surface be R2, and a distance from a tip end of the intermediate protrusion to a tip end of the end protrusion be H in a section perpendicular to the central axis of the end protrusion, the following relationship is set:

$$R1+R2=H.$$

10. The leveling plate according to claim 9, wherein the end protrusions are provided symmetrically across the intermediate protrusion, and extend in parallel with the intermediate protrusion.

11. A thrust bearing device, comprising:
a first leveling plate and a second leveling plate, the first and second leveling plates comprising the leveling plate according to claim 10;
the second leveling plate being disposed so as to be inverted about the third direction with respect to the first leveling plate and to alternate with the first leveling plate;
a first member having a first surface which comes into contact with an area on an opposite side of the end protrusion in the third direction of the first leveling plate; and
a second member having a second surface which is provided in parallel with the first surface and comes into contact with an area on an opposite side of the end protrusion in the third direction of the second leveling plate, the second member holding the first leveling plate and the second leveling plate, which are provided in an alternating manner, between the second member and the first member.

12. The thrust bearing device according to claim 11, wherein
the first leveling plate and the second leveling plate are in contact in a state that central axes of the end protrusions of the first leveling plate are non-parallel with central axes of the end protrusions of the second leveling plate.

13. A rotary mechanical device, comprising:
a rotary body which rotates about a center of a shaft member; and
the thrust bearing device according to claim 11, which supports the rotary body in an axial direction.

14. A thrust bearing device, comprising:
a first leveling plate and a second leveling plate, the first and second leveling plates comprising the leveling plate according to claim 9;
the second leveling plate being disposed so as to be inverted about the third direction with respect to the first leveling plate and to alternate with the first leveling plate;
a first member having a first surface which comes into contact with an area on an opposite side of the end protrusion in the third direction of the first leveling plate; and
a second member having a second surface which is provided in parallel with the first surface and comes into contact with an area on an opposite side of the end protrusion in the third direction of the second leveling plate, the second member holding the first leveling plate and the second leveling plate, which are provided in an alternating manner, between the second member and the first member.

15. The thrust bearing device according to claim 14, wherein
the first leveling plate and the second leveling plate are in contact in a state that central axes of the end protrusions of the first leveling plate are non-parallel with central axes of the end protrusions of the second leveling plate.

16. A rotary mechanical device, comprising:
a rotary body which rotates about a center of a shaft member; and
the thrust bearing device according to claim 14, which supports the rotary body in an axial direction.

* * * * *